(12) United States Patent
Flanigan

(10) Patent No.: US 8,449,038 B2
(45) Date of Patent: May 28, 2013

(54) CAR SEAT PRESSURE DECELERATION CONTROLLER

(76) Inventor: George Ray Flanigan, Mt. Prospect, IL (US)

( * ) Notice: Subject to any disclaimer, the term of this patent is extended or adjusted under 35 U.S.C. 154(b) by 267 days.

(21) Appl. No.: 12/931,239

(22) Filed: Jan. 27, 2011

(65) Prior Publication Data
US 2011/0187177 A1 Aug. 4, 2011

(51) Int. Cl.
*B60R 21/00* (2006.01)
*B60R 22/00* (2006.01)

(52) U.S. Cl.
USPC ................... 297/468; 297/487; 297/216.1

(58) Field of Classification Search
USPC ........................ 297/216.1, 468, 487
See application file for complete search history.

(56) References Cited

U.S. PATENT DOCUMENTS

| | | | | |
|---|---|---|---|---|
| 4,569,534 A * | 2/1986 | Nalbandyan et al. | ......... | 280/749 |
| 4,592,523 A * | 6/1986 | Herndon | ................. | 244/122 AG |
| 4,906,020 A * | 3/1990 | Haberer | ......................... | 280/749 |
| 5,226,672 A * | 7/1993 | Husted | ........................... | 280/749 |
| 6,623,075 B2 * | 9/2003 | Baloga et al. | .............. | 297/250.1 |

* cited by examiner

*Primary Examiner* — Sarah B McPartlin

(57) ABSTRACT

An improved car seat pressure deceleration controller apparatus for providing in pressure through harness means positioned across the front chest of a seated occupant of a passenger vehicle, movable upon impact of the vehicle by activation of electric solenoid means connected by cable means extended over pulley means to engage an upper portion of the harness means, and to move the harness means in an elevated position to encompass over the head of the occupant, and the harness means being connected along its lower portion to tension belt means, controlled by gearbox drive means and motor means to provide deceleration controlled movement to the harness means to decelerate the movements of the harness means, and programmable computer and processor means to determine the position of the harness means to determine the deceleration control for the harness means.

14 Claims, 1 Drawing Sheet

CAR SEAT PRESSURE DECELERATION CONTROLLER

BACKGROUND OF THE INVENTION

1. Field of the Invention

The present invention relates generally to the application of improvements to vehicular passenger safety devices or apparatus and in particular to the field of deceleration controller apparatus such as vehicular stored air-bags intended to be deployed in vehicular accidents to provide controlled deceleration of or stability of a driver, passenger or occupant already strapped into seated position by seat-belt devices or torso harnesses, intended to minimize injuries suffered by the rapidly hurled occupant or air-bag impacted occupant during vehicular impact.

2. Background of the Invention

There is replete in the pertinent prior art, a wide variety of types, shapes and deployments of air-bags, means of storage or release of air-bags, designs and utilities of seat belts or torso harnesses generally utilized to restrain the occupant in a passenger seat, and to impede, intercept and/or control the continued movements of the occupant's body (upper body) which is suddenly left moving at the same rate of speed as was the vehicle, upon the event of a crash or impact accident. The attained results of minimizing harm or injury to the occupant by such means of air-bag deployment and use of seat-belt or torso harnesses have been mixed at best and often times less than desirable. For example, safety tests are often conducted at crash speeds of 30 MPH or less, and the majority of prior art safety devices are less than adequate to prevent or retard serious injury during severe impact forces of higher speed accidents. As a standard practice, the automobile industry and state laws require the use of seat belts and air-bags as standard equipment in passenger automobiles. The prior art has not taught the application of controlled deceleration applied for vehicular applications, although examples of controlled deceleration are used on an aircraft carrier to employ nets or lines to snare incoming airplanes to provide rapid but controlled deceleration.

The field of application of the present invention is applicable to any moving vehicle wherein the passenger can be strapped into a seated position by standard configurations of seat belts, wherein the present invention provides improved safety net harness means for controlling the deceleration of the passenger's upper body during high-speed impacts either without injury altogether or minimizing the impact injuries as would otherwise be suffered by improved deceleration controller device comprising the present invention. The safety net harness means is a combination assembly of raising the harness means upon impact to enclose the occupant's torso, head and neck in the safety net to provide deceleration, and to employ motor and gearbox means to control the restraint of the safety net harness and to provide sensing apparatus to measure the forces being applied to the safety net harness and to measure the trajectory of the occupant's movements to use with the motor and gearbox means in controlling the movement of the harness means and providing deceleration needed to prevent injury to the occupant. The present invention would ideally supplant current state-of-the-art industry standard types, shapes, and methods of deployments of seat-belts or torso harnesses even while combined with a variety of deployed air-bags. Where speed is essential, electrical and computer components provide a more finite control.

There is provided for the present invention an improved deceleration controller apparatus for providing in combination both controlled restraint and deceleration controlled movements of an automobile occupant at time of impact or collision, and includes movable harness means positioned over the central mid-section or chest area of the torso of the seated occupant, connected at its upper portion to combination cable means and electric solenoid means, impact switch means to detect impact, and programmable logic computer and PC processor circuit means to provide output signal to activate the electric solenoid means triggered by the impact switch means, to tighten the cable means connected to the movable harness means at its upper portions, left and right side thereof, whereby the harness means is engaged to be moved upon collision impact to be pulled over the head of the occupant to provide uniform engagement of the body and head of the occupant to guard against injury, and further, the harness means is engaged or connected along its lower portions, preferably the left and right side thereof, by tension belt means engaged over controller pulley means and controlled by gearbox means and connected motor means to provide deceleration control to the movements of the harness means proportional to the measured forces of impact and measured movements of the occupant against the harness means, to control the movements of the occupant during impact, through deceleration control of the harness means and thus the occupant.

DESCRIPTION OF THE PRIOR ART

There are provided in the pertinent prior art, a multiplicity of air-bag devices and configurations and variety of mounts, and a further multiplicity of seat belt means including straps extended across the lap of a seated occupant, branched straps also extending diagonally across the torso of a seated occupant and snapped into a receiving buckle device such as a standard seat belt buckle, and used with harness devices of various configurations. Such wide variety of seat belt and air-bag configurations and their methods of impact release or deployment, largely do not teach a means of controlling and providing deceleration to the occupant upon impact, but as to seat belts, are simply provided to remain engaged without movement or breakage, and in the case of air-bags are provided in a packed away compartment to be released upon attainment of predetermined impact forces to intercept the occupant's forward moving torso and/or head and provide a counter-acting impact that provides a degree of deceleration. It is well known and acknowledged in the automobile industry that deployed air-bags often cause injury to the occupant from the impact forces of the air-bags against the occupant, and often the deployment of the air-bag is not uniformly engaging of the occupant, so that neck and head injuries occur. Many serious injuries occur from the use of seat belts themselves, which do not provide deceleration of movement but restrain movement across the lap or chest of the occupant. It is desirable to provide a movable harness means capable of restraining the occupant in a controlled manner, to apply counter forces to the movements of the occupant by and through use of the harness means, to sense and measure the trajectory of the occupant by measuring the movements of the harness means, and to instantaneously move the harness above the head of the occupant upon impact to uniformly engage the occupant's head, neck and upper torso in and by the harness whereby pressure applied restraint of the harness is more uniformly applied to the moving occupant.

The present invention provides restraint of the occupant as though caught by the net or webbing of the movable harness, and controls the movements of the harness to apply deceleration forces, and further measures and predicts the trajectory of the moving occupant during impact to prevent or minimize injury. The improved net-like harness means is mounted in its inactivated state or regular position across the mid-section or chest area of the torso of the seated occupant as a supplement to or in lieu of a standard seat belt, but upon occurrence of vehicular impact, is instantly deployed to be raised over the head of the occupant to provide uniform deceleration control of both the torso, head and neck of the occupant as engaged by the net or webbing of the harness means in the design and utility of the present invention, and also provides a unique combination of deceleration control apparatus effective for the upper portion of the improved harness means and the lower portion of the improved harness means, whereby angular movements of the harness means are determined and controlled, forces of the occupant against the harness means are determined and controlled by mechanical action of restraint provided by motor means and interconnected gearboxes to provide drive to connecting tension belts connecting to the harness, while providing continuous input signals from angle meters, weight scale means, and speedometer encoder for speed responsive signals read by encoder device, corresponding input signals are received to programmable logic computer means combined with PC processor circuit means utilized to triangulate and extrapolate the every changing position of the occupant's body during impact and to control the movements of the occupant's body through pressure applied deceleration forces generated by the motor means and interconnected gearbox drive means then transmitted to the harness means. The harness means thus provides continuous restraint of the occupant during movements of the automobile during impact, including initial impact or roll-overs or when positioned in non-upright positions, and is effective to return the occupant to an upright seated position before release. The prior art is not known by the inventor to provide such deceleration controller apparatus, and certainly not in the combination of the deceleration controller apparatus and its application as shown and disclosed by detailed description and drawings of the present invention.

The present invention is the subject of a provisional patent application entitled "Car Seat Restraint Pressure Deceleration Controller" under Ser. No. 61/206,369, filed Jan. 30, 2009, and further filed under the same title, in the form of a continuation provisional patent application Ser. No. 61/337,046 filed Jan. 29, 2010,

SUMMARY OF THE INVENTION

The present invention provides an improved deceleration harness controller device or apparatus comprised in combination and including net-like torso safety movable harness means comprising safety net harness means being deployable in a first position non-activated position before impact movement thereof, which first position is to provide that the harness consisting of a generally rectangular flexible four-cornered net, to be positioned across the vertically disposed front torso of an occupant when the occupant is in seated position in the vehicle, seat belt means with buckle means to connect the occupant to the supporting passenger seat of the vehicle, impact pressure switch means to engage upon pressure of the seated occupant to turn on circuit control means of the improved deceleration controller apparatus, electric activated solenoid means to provide detractive movement of the connected harness means upon electrical activation by the circuit control means caused by impact, electric activated motor controller means to regulate and control the detractive movement of the solenoid means upon activation thereof caused by impact, cable means connected between the solenoid means and the top portion of the safety net harness means to provide rapid upward movement of the safety net harness means with detractive movement of the solenoid means to cause the harness means to cover the head of the occupant upon impact, frame means to provide frame mounting positions of components, generally positioned rearwardly of the seated occupant, four-point pulley means fixedly supported by the frame means and comprised of two parallel spaced-apart pairs of pulley means mountable to the frame means, one pair of spaced-apart pulley means provided forwardly and rearwardly of and above the left shoulder of a seated occupant and the other pair of spaced-apart pulley means provided forwardly and rearwardly of and above the right shoulder of a seated occupant, each pair of pulley means providing left and right guidance control, respectively, for left and right positioned portions of the cable means to provide guiding movements of the cable means over the left and right positioned pulley means respectively, the left and right portions of the cable means being connected to the spaced-apart upper left and right corner areas, respectively, of the vertically positioned frontal safety net harness means to provide uniform upward movement of the harness means to cover the head of the occupant upon detractive movement of the solenoid means when activated, computer aided control circuit means for providing activation of the deceleration controller device upon the activation of the pressure switch means, electric motor means providing elements of speed and directional control to the safety net harness means in relationship to vehicular speed of travel at the time of impact and force of impact, a pair of spaced-apart controller pulley means mounted to pivot axially of the central longitudinal axis of the electric motor means, a pair of tension seat belts means, each one of the pair thereof connected on its free end portion to the lower left and lower right portions, respectively, of the vertically disposed safety net harness means, and on the other end portion is connected to an associated one of the pair of spaced-apart controller pulley means, a pair of spaced-apart digital angle meter means, each one of the pair thereof being associated with one of the tension seat belts means, and responsive to continuously read the angle of the associated tension seat belt means to generate angular data signals measuring the angular movements of the associated tension seat belt connected to the lower portion of the harness means, programmable logic computer ("PLC") circuit means combined with PC ("PC") processor circuit means connected to receive the angular data signals from each of the pair of digital angle meter means as a component input signal used to compute triangular positions of the associated tension seat belt means to triangulate the exact position of the occupant restrained by the safety net harness means, a pair of spaced-apart gearbox controller means, each one of the pair thereof connected to the electric motor means and to the associated controller pulley means to provide control torque forces required for proper directional and force controlled deceleration for both frontal and side-to-side movements of the safety net harness means responsive to the force of and direction of the occupant's upper body movements upon impact, impact spring-loaded pressure switch means having switch contacts, and being set to predetermined spring-load force and upon closure of the switch contacts thereof, effective to activate the control circuit means for the deceleration controller device, electronic weight scale means having extending arbor means to provide connection between the extending arbor means and an associated one of the seat belt means as connected to the a selected lower portion of the safety net harness means whereby the weight scale means reads the force of movement of the occupant's body upon impact through pressure on the safety net harness means, and provides continuous signals responsive thereto to the PLC circuit means and its associated PC processor circuit means defining a combined PLC and PC circuit means also receiving input signals from the angle meter means, speedometer encoder means to measure speed of the vehicle and providing input signals to the combined PLC and PC circuit means, and the weight scale means providing input signals to the combined PLC and PC circuit means, enabling the PLC and PC circuit means to provide by extrapolation process, the exact trajectory, speed and force of movement to provide triangulation of the exact position of the occupant and the amount of force and torque required to properly decelerate the moving occupant through contact with the safety net harness means to restrain and decelerate movement of the occupant without serious injury suffered. The finite pressure control of the occupant's movements are predetermined never to exceed 7 G forces of gravity for an adult and 5 G forces for an occupant of a child's seat. It is optional but desirable to provide power source means for the electronic motor controller means associated with the control of the solenoid means by use of a battery, particularly for use with a portable child's seat, since the energy source must remain with the portable seat in the event of switching vehicles, or dropping or bumping the child's seat while outside of the vehicle.

There is provided on-off buckle and electrical switch means with contact block means providing activation of switch contact means for an "on" state when the buckle means is clamped, to activate the PLC and PC circuit means. Further provided is alarm fault means to sound audible or electronic fault by the PLC circuit means in the event of discontinuity in the control switch, input signals or instruction fault, or emergency signals are activated. There is also further provided a between-the-legs safety buckle means to buckle to the bottom of the safety net harness means to prevent the child occupant of a child's seat from slipping down and out of the seat, and provided in all installations and uses of the present invention interior to the vehicle as well as for use in connection with a child's seat. Brackets means are provide for mounting of the pair of spaced apart upper disposed pulley sets that guide the cable means that connect to the top of the harness means, a left sided bracket means in the direction of travel and a right sided bracket means, and at least the left sided bracket means are mounted to be pivotable to permit being swung outwardly approximately 90 degrees to accommodate an occupant entering into and dismounting from the associated vehicular seat to which the improved deceleration controller device is provided. Further provided is emergency stop button switch means to provide with activation of the button switch for emergency deactivation of the deceleration controller apparatus of the present invention.

It is an object of the present invention to provide controlled deceleration of the occupant upper body by improved deceleration controller apparatus utilizing a safety net harness means which is maintained in an inactivated state to be disposed to extend across the torso of the occupant no higher than upper chest area, and upon circuit activation resulting from vehicular impact, including roll over, the safety net harness means is instantaneously pulled over the head of the occupant to uniformly restrain and decelerate the occupant's torso, head and neck, and provides upper movement of the harness means by electrical-mechanical combination of cable means connected to the upper left and right corners of the harness means, and extended over and guided by left and right sided (in the direction of travel) pairs of pulley means, and connected to electric solenoid means activated by impact switch and buckle means which in turn are activated upon impact forces being applied to the harness means, which electric solenoid means provides mechanical detraction to the cable means and thereby to the harness means.

It is another object of the present invention to provide added controlled deceleration of the occupant upper body by employing or providing deceleration controller apparatus to the lower portion of the harness means, by combination of electric motor controller means having center-axial rod means extending on each side thereof to the left and right side of the seated occupant and mounted in a plane disposed rearwardly of and parallel to the plane in which the hips of the occupant are located while seated in a car seat, a pair of seat belt controller pulley means axially mounted to each the left and right free end portions of the center-axial rod means, a pair of gearbox controller means axially mounted to each of the left and right side of the center-axial rod means between the electric motor controller means and the seat belt controller pulley means, respectively, a pair of tension seat belt means provided in continuous closed loop extension to extend over the left and right sided controller pulley means, respectively, and free end portions of the left and right sided tension seat belt means, respectively, connected to the left and right side of the lower portion of the harness means, wherein the gearbox controller means provides deceleration control of movements of the safety net harness means through the left and right sided tension seat belt means connections with the left and right sided lower portions of the harness means, respectively, electronic weight scale means having an arbor extension thereof provided in contact with the left sided tension seat belt means to measure the travel of the left sided tension seat belt means for ascertaining the force of the occupant's body pressing against the harness means, and generating continuous input signals responsive to the measurements of travel of the harness means and forces against the harness means, programmable logic computer ("PLC") circuit means combined with PC ("PC") processor circuit means to comprise combination PLC and PC circuit means connected to receive the input signals from the electronic weight scale means, a pair of spaced-apart digital angle meter means, each one of the pair thereof associated with one of the left or right sided tension seat belts means, respectively, and each thereof being responsive to read the angle of the associated tension seat belt means to generate angular data signals sent to the PLC and PC combination circuit means, speedometer encoder means to provide input signals responsive to occupant's speed, and connected to input of the PLC and PC combination circuit means, whereby the combined input signals from the weight scale means, the angle meter means, and the speedometer encoder means speed input signals, enable the PLC and PC combination circuit means to continuous triangulate the exact position of the seated occupant and the amount of force against the harness means to provide the desired deceleration control to the lower portion of the harness means, which harness means is held at the top portion of the harness means by the detractive action of the electronic solenoid means and connecting cable means, and positioned over the head of the occupant to uniformly apply deceleration restraint to the torso, head and neck of the occupant upon and during impact forces until such forces cease, and to return the occupant to or hold the occupant in, an upright seated position.

It is a further object to provide control circuit means to provide continuity of electrical control for the various input signals generated for use by the PLC and PC circuit means, and to provide the activation of the PLC and PC circuit means, by switch contact made or provided by closure of a contact block provided by safety net buckle means having electrical switch means providing mechanical contact block means, whereby the making or closure of the contact block means of the electrical switch means of the safety buckle means activates the PLC and PC circuit means.

It is still another object to provide an alarm fault horn means to be activated by the PLC and PC circuit means if there occurs a breech in continuity of the control circuit means, any input signals thereto or an instructional fault, or if the emergency stop means is activated.

It is a further object to provide between-the-legs safety buckle means to be disposed or located at the bottom of the safety net harness means to provide buckling of lower extremity of the harness means between the legs of the occupant to fixed mount means provided on the seat on which the occupant is seated. This buckle is believed to be optional for passenger seats except for baby seats. The between-the-legs safety buckle means is effective to arrest the occupant or child positioned in a child's seat from slipping down and out of the seat. This between-the-legs safety buckle means to prevent slipping downwardly of the harness means is highly desirable in the present invention.

It is a desired object of the present invention to provide upper left and right sided mountable brackets to which the pair of left and right sided upper pulley means are mounted, and to further provide that the left sided bracket is pivotable and releasable to pivot outwardly by approximately 90 degrees to permit the occupant to enter or exit the seated position of the occupant where there is provided the harness means and the deceleration controller apparatus of the present invention.

It is another object to provide speedometer encoder means to continuously provide speed responsive input signals, such as by use of a standard encoder circuit to provide digital signals to a processor as may be used in a desktop computer to combine digital speed signals from the speedometer encoder means, the angle meter means and the electronic weight scale means to extrapolate the exact trajectory of an object such as the moving occupant body upon vehicular impact.

There is provided pressure switch means preferably mounted to be automatically activated by the pressure of a seated occupant to thereby activate the main control circuit means. The various mechanical and electrical or electronic parts of the deceleration controller apparatus may be mounted to and within the passenger seat where the occupant is designed to be seated, including the use of frame means in part on which to mount upper bracket means and pulley means and cable means, or may be provided to be mounted to a portable seat such as a child's seat. These and other objects and uses and applications of the present invention will become readily apparent or obvious from the review and consideration of the disclosure of the present invention contained in the following specification and drawings, and all such other or obvious objects and uses and application are intended to be covered in the scope and intent of the detailed description of the present invention.

BRIEF DESCRIPTION OF THE DRAWINGS

Similar reference characters shall denote corresponding parts, features, or elements of the present invention consistently throughout the attached drawings.

DETAILED DESCRIPTION OF THE PREFERRED EMBODIMENT

Figure 1:
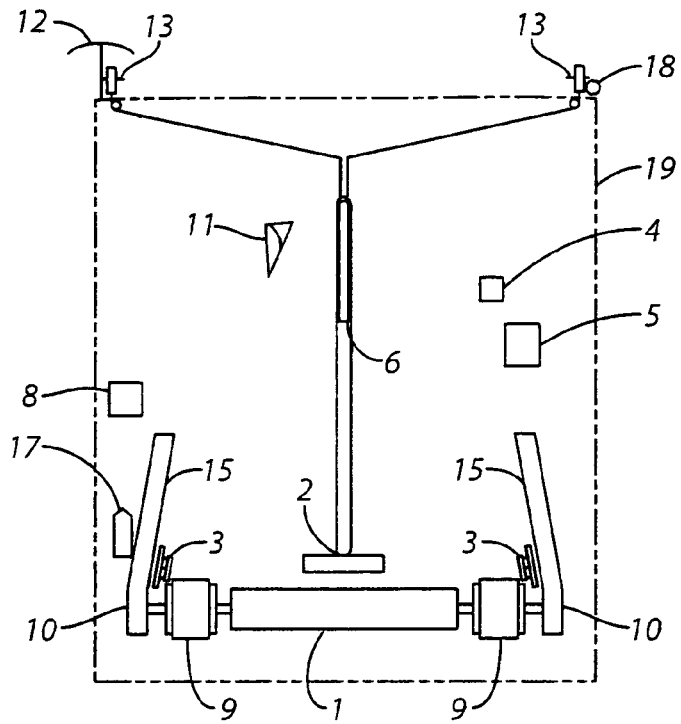
FIG. 1 is a frontal perspective view of the deceleration controller apparatus of the present invention.
Figure 2:
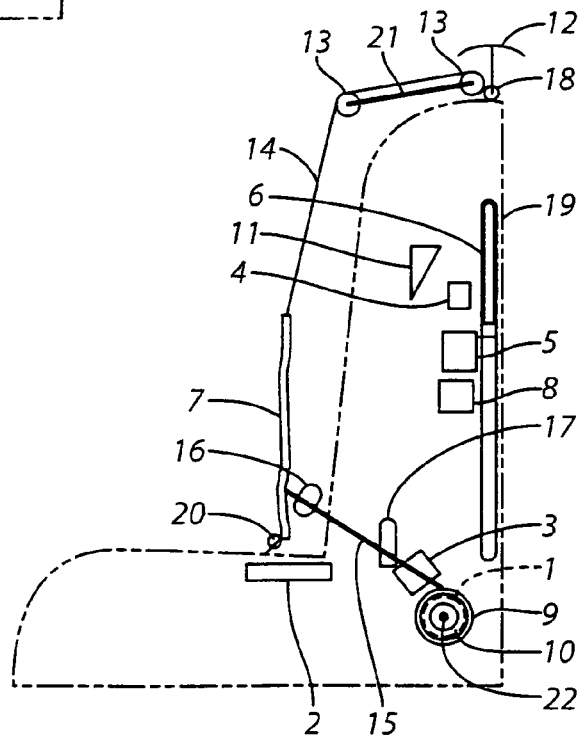
FIG. 2 is a side perspective view of the deceleration controller apparatus of the present invention.

There is shown in FIG. 1 in accordance with the improved assembly of deceleration controller apparatus of the present invention, electric motor means at 1 mounted with its elongated axial dimension to lie in a plane rearwardly of a seated occupant (not shown in the drawings) best illustrated in FIG. 2 of the drawings. The electric motor may be AC or DC and the speed of the motor and direction of torque are determinative factors of providing the desired and continuously changing tension to effect the desired level or degree of restraint and/or deceleration of the seated occupant after a collision of the vehicle in which the improved assembly comprising the deceleration controller is mounted. The elongated axis of the motor means 1 is effective to extend to a left side of the motor means 1 and the right side of the motor means 1, with a suitable radial sized rod or shaft means on which to mount other needed components are as best shown in FIG. 1 and hereinafter described.

The passenger vehicle provides the passenger seat (hereinafter referenced at 19 in the drawing), and particularly the front passenger seat, on or in which to construct or mount the improved deceleration controller apparatus of the present invention, or alternatively, the deceleration controller apparatus may be provisioned on or with a portable child's seat to be placed in or taken out of the vehicle. A passenger seat outline is provided by dashed lines in both FIG. 1 and FIG. 2, and is later assigned the reference character 19. There is provided standard seat pressure switch means 2 as best shown in FIG. 1 of the drawing, preferably disposed at the bottom of the vehicle seat, and being responsive to pressure provided by the seated occupant to turn on the switch means thereof to complete continuity of standard circuit control means which is needed and utilized to receive input signals as shall be described from components of the decelerator controller apparatus, and provide electrical functioning needed for the operation of the decelerator controller apparatus of the present invention. The circuit control means is not further described in this specification or illustrated in the drawing, nor is any electric schematic provided, as this provision is thought to be unnecessary and readily available to the practitioner of the pertinent art.

A pair of angle meter means are provided and shown at 3 in FIG. 1 and FIG. 2, which angle meter means are used for reading angular positions of tension seat belts 15 and providing angular input signals (digital signals) and are described more fully hereinafter. Several angle meter devices are suitable for use with the present invention and include but not limited to, Model No. Pro 3600 manufactured by Macklanburg and Accustar Electronic Clinometer manufactured by Schaevitz Sensors. It is a feature of the present invention to determine by triangulation technique and extrapolation the exact position of the seated occupant, as measured by several input signals to be described in this specification. To this end, there is provided a programmable logic computer ("PLC") interfaced or combined with PC computer processor means, to comprise a combination PLC and PC circuit means, indicated by block illustration at 4 of FIG. 1 and FIG. 2 to be mounted as desired in the interior of the passenger seat in the preferred embodiment of the present invention. Numerous manufactured embodiments of the PLC logic computer means that can perform the required tasks required by this invention include but are not limited to, Allen Bradley 2/17, PLC-5 Family Programmable Controllers, and GE Fanuc, 90 series. All computations and instructions are carried out in milliseconds. A personal computer ("PC") can be interfaced with the PLC logic computer means obtaining faster computation speeds, and are common in the industry to be interfaced with PC's for providing quality control functions. Such combination PLC and PC circuit means are used with video cameras to read bar codes, numbers and sorting of parts. Samples of PC circuit means include but are not limited to, Dell Inspiron Desktop Series and Hewlett Packard Pavilion Desktop Series.

Electronic motor controller means are shown at 5 in FIG. 1 and FIG. 2, by block illustration, to be mounted as desired in the interior of the passenger seat in the preferred embodiment of the present invention. There are multiplicities of suitable controller devices that can be used in the application as taught by the current specification, but for a portable child's seat, a 12-volt controller and associated power source such as a battery 8 can be used economically. The battery 8 is used as a power source in the present invention. Examples of suitable motor controller means include but are not limited to Allen Bradley, Cutler Hammer, Reliance Electric and Square D controllers, and are made for DC motors, or a programmable motor controller is made for AC applications.

Electric solenoid means are provided and illustrated at 6 in FIG. 1 and FIG. 2 of the drawing, and the longitudinal axis of the solenoid means is provisioned to be activated to provide mechanical movement along its vertically mount position. The PLC and PC circuit means 4 provides an output signal to activate the solenoid means 6. The improved safety net harness means or apparatus 7 is shown in FIG. 2, and in its preferred embodiment, is a generally rectangular shaped webbing that is to extend in its deactivated first use position across the front of the torso or chest section of a seated occupant, and held in position by connecting cable means illustrated at 14 to be more fully described. In accordance with the present invention, the top portion of the solenoid means 6 is connected by cable means 14 to the harness means 7, which cable means are provisioned to extend upwardly and branched to extend outwardly to the left side (as viewed in the direction of travel) and to the right side of a desired width of expansion of the upper portion of the deceleration controller apparatus.

There are provided at 9 in FIG. 1 and FIG. 2, a pair of gearbox drive means mounted on each side of the electric motor means 1 along the longitudinal axis thereof on the left side and right side of the motor means 1 as is best shown in FIG. 1. The gearbox drive means 9 provide finite control of the occupant as the torso moves forward and from side to side. Gearboxes are deemed required since no motor itself can provide the extreme level of torque forces that are required to control the seated occupant of a very large person. An example of a suitable gearbox device includes but is not limited to, Boston Gear Box.

Further, there are provided a pair of guidance controller pulley means as illustrated at 10 in FIG. 1 and FIG. 2, and the preferred left and right disposition of the pulley means 10 is best shown in FIG. 1, mounted on the outside of each of the gearbox means 9 and mounted on the longitudinal axis of the motor means 1. Impact switch means 11 is illustrated to be mounted in the passenger seat in both FIG. 1 and FIG. 2 and is a standard spring loaded pressure switch, enabled by closure of contacts upon the force of or incident of impact of a collision. A predetermined spring load allows the pressure switch means 11 to be set for any predetermined pressure set point. When the pressure switch means 11 is made or activated, the control circuit means for the deceleration controller apparatus is activated. An emergency stop button means 12 is shown in FIG. 1 and FIG. 2 and comprises a standard E-Stop switch required by applicable federal law for electrically controlled industrial machines. After the switch button is depressed, the standard mushroom shaped button must be manually pulled out to reactivate the circuit in which the E-Stop switch is implemented. When the E-Stop switch means 12 is pushed in or depressed, the control circuit is not enabled.

In accordance with an advantage of the present invention, four guidance controller pulley means are provided at 13 and are comprised of two pairs of spaced-apart pulleys at 13 on the left and right side, respectively, of the upper extremities or corners of the deceleration controller apparatus pictured in FIG. 1 and FIG. 2. As best shown in FIG. 1, the spacing of the two pairs of pulleys at 13 are shown, and in FIG. 2, it is clearly shown that for each pair of the pulleys 13, there is a forwardly mounted pulley 13 and a rearwardly mounted pulley 13, to provide accommodation for vertical alignment with the forward position of the harness means 7 to provide required alignment to enable virtually instantaneously pulling the movable harness means 7 upwardly and over the head of the occupant upon impact collision. For this purpose, the is provided guide cable means 14 shown in FIG. 2 connected to the harness means 7 generally on the upper outer corners thereof to provide uniform lifting of the harness means by the cable means 14 guided by the positioning of the associated pairs of pulley means 13.

The cable means 14 is extended from the left and right side corner connections to the harness means 7 over the pairs of pulleys 13 aligned therewith on the left side and right side corners of suitable frame means (not assigned reference number, as any suitable frame means may be provided, and is well within the application of the practitioner of the pertinent art), firstly to lie in the grove of the forwardly disposed pulley 13 on each the left side and the right side of the deceleration controller apparatus, FIG. 1 and FIG. 2, and then secondly to lie in the V-grove of the rearwardly aligned pulley 13 of each pair of pulleys 13. It is then provided to bring the cable means left and right sided segments to be joined together in the rear of the deceleration controller apparatus as shown in FIG. 1, to extend with a single cable strand 14 to connect to the solenoid means 6 heretofore introduced. The solenoid means 6 is mounted to the upright part of the front seat of the vehicle, and when energized, the cable means 14 is caused by the detractive moving action of the solenoid 6 to tighten responsive to activation of the solenoid 6, the cable means 14 being effective to rapidly pull the harness means 7 over the head of the occupant to engage the occupant's head and neck and torso more uniformly than simply would be the case if the harness means were to remain only across the chest area of the torso of the occupant. At the moment of impact, an input signal from the impact switch means 11 is sent to the PLC and PC circuit means 4 to send an output signal to the solenoid means 6, which energizes the solenoid means 6 to provide the desired retraction and tightening of the cable means 14 and lifting of the harness means 7. The solenoid means 6 is a common industrial solenoid device provided by many companies in the industry. In this manner set forth, the top of the harness means 7 is pulled over the occupant's head upon vehicle impact. It is desired and an object of the present invention to generally enclose the body and the head of the occupant in the harness means 7, utilizing the net-like preferred configuration for the harness means 7, in order to achieve preventing the head and neck from moving freely of the harness means 7, to prevent twisting and bending causing injury upon impact. Either twisting or bending can be seen to cause serious injury and even breaking the neck or serious head injury from impact. Head injuries are an acute problem with children during impact, and the decelerator controller apparatus is useful to apply to a child's portable seat. The harness net 7 can be fabricated of a wide variety and choice of materials including but not limited to Nylon and Kevlar. Nylon is strong enough to replace chains on loading docks.

It is a feature of the present invention to provide tension seat belt means 15, earlier referenced with the guidance primary pulley means 10 as were shown to be mounted along the longitudinal axis of the electric motor means 1 in FIG. 1. The pulleys 10 are spaced-apart on the generally free-end portions of the longitudinal axis shaft or rod extending to the left and right side thereof on which is also mounted the gearbox means 9, also provided in a pair of gearbox means 9. The tension seat belt means 15 are comprised of a pair of tension belts 15 (referred to hereafter as tension belt means or tension belts, one thereof for engaging in a continuous loop, the pulley 10 on the left side of the motor 1 and another for engaging in a continuous loop, the pulley 10 on the right side of the motor 1. As is clearly shown in FIG. 2, the left sided tension belt 15 is connected on its free-end or distal portion provided, to connect to a selected lower portion of the left side of the vertically aligned harness means 7. The other end portion of the left side tension belt 15 is engaged around and closed upon in a continuous loop fashion to the aligned left side pulley 10. The right side tension belt 15 is similarly connected on its free-end or distal portion provided, to connect to a selected lower portion of the right side of the vertically aligned harness means 7. The other end portion of the right side tension belt 15 is engaged around and closed upon in a continuous loop fashion to the aligned right side pulley 10. The pulleys 10 are mounted on the arbors of the gearbox means 9 and are driven by the movements of the gearbox means 9. The movement of the harness means 7 by pressure of impact causes the connected tension belts 15 to move, and to be controlled by the associated gearbox drive means 9 and the connected motor 1. The material of which the tension belts 15 may be made is the same fabric as are seat belts in vehicles approved by federal law.

The pair of angle meter means 3 earlier introduced in this specification are mounted to read the angles of the tension belts 15, respectively, as are provided on the left side and right side of the motor means 1. Also provided with the standard variety of seat belt buckles used to snap in the occupant, is electrical buckle switch means 16, FIG. 2, having contact block means which when the contacts thereof are made by the buckling of the seat belt by the occupant, the PLC and PC circuit means 4 is turned on or activated. An important feature of the present invention is electronic weight scale means 17 shown in FIG. 1 and FIG. 2, having an extending arbor portion to attach to, as by a simply means of a ring-like member encircling the associated left side tension belt 15, the left side mounted tension belt 15 generally nearer to the free end or distal portion thereof as is connected to the harness means 7. Upon impact, the forward movement of the occupant pushes against the harness means 7 and the tension belt 15 travels with the harness means 7. The weight scale means 17 is used to read the force of the pushing on the harness means 7 to send a signal generated by the weight scale means 17 to the PLC and PC circuit means 4. By computing the input signals from the angle meter means 3, the speedometer encoder means and the weight scale means 17, the PLC and PC circuit means 4 can triangulate the exact position of the seated occupant and the amount of force against the harness means 7. This is the means of providing finite control of the movements of the harness means 7 and thus the occupant during impact. The PLC and PC circuit means 4 has been disclosed in more detail than presented herein.

Alarm fault audible means such as a horn device is shown or illustrated to be provided at 18 of FIG. 1 and FIG. 2. The audible sound of the horn is activated by the PLC and PC circuit means 4 if there occurs a breech in continuity in the control circuit, input signal or instruction fault, or if the E-Stop button 12 is pushed. The passenger seat 19 shown in the drawing, can be any vehicle seat of a standard variety, or could be a portable child's seat removable from the passenger car. The components herein detailed and described to comprise the present invention of the deceleration controller apparatus, may be mounted in the passenger seat 19 or in or on a portable child's seat (not shown).

There is provided at 20 as more clearly shown in FIG. 2, safety buckle means 20 shown mounted at the bottom of the harness means 7 and centrally disposed thereof, and connected to the harness means 7 to anchor the harness means 7 to the passenger seat 19. The safety anchor buckle means 20 is optional as provided in applicable federal law except for child's seats. The safety anchor buckle means 20 arrests the occupant from slipping down and out of the harness means 7, and is viewed by the inventor is required for the deceleration controller apparatus of the present invention. It is at once obvious that the safety buckle means 20 must be mounted as with connecting flexible strap to the harness means 7 to not prevent the upward movement of the harness means 7 to engage over the occupant's head upon impact. At 21 there is shown to provide a pair of mounting bracket means, one bracket means on the left side of the frame means on which to mount the pair of left sided and right sided pulleys 13 respectively, and to further provide that the left side bracket means 21 is made to be pivotable outwardly generally 90 degrees to move out of the way to permit the occupant to be seated on the seat 19, or to exit from the seat 19. A speedometer encoder means shown at 22 in FIG. 2, is utilized to provide digital speed input signals to the PLC and PC circuit means 4. The speedometer encoder means can be a standard digital speedometer or an encoder. The PC processor means of the PLC and PC circuit means 4 can combine the digital signals from the angle meter means 3 with these input signals from the speedometer or encoder means to extrapolate the exact trajectory of any object.

The harness means 7 is only pulled over the head of the occupant when the impact pressure switch 11 is made or activated. At the moment of the crash impact the harness means 7 is pulled over the head of the occupant and constant deceleration pressure and control of such pressure on the occupant is maintained. After the crash subsidizes, the movement of the harness means 7 responsive to the controller apparatus of the present invention will return the occupant to his original seated position. In the event there is a subsequent crash or roll-over, the controller apparatus of the present invention is continued to be activated until the impact forces are zero. Standard deployments of air-bags cannot achieve these novel features. Other equally equivalent embodiments of the present invention are readily apparent and are intended to be included in the detailed description made herein. Minor modifications, changes in dimensions or materials or sizes and configurations of magnet devices, and means of attachment to the strap device 10 are intended to be included herein.

What is claimed is:

1. An improved car seat pressure deceleration controller apparatus for use in passenger vehicles carrying seated occupant useful for safety of occupant upon collision impact thereof, comprising in combination, movable harness means having centrally disposed net means, and being held in a non-activated position generally across the mid-section of the upright seated occupant thereof, pressure switch means activated by the seated occupant, electric solenoid means movable with detractive movement and activated by solenoid input signal upon collision impact, cable means connecting the solenoid means to the movable harness means effective upon detractive movement of the solenoid means, to pull the harness means upwardly by a predetermined distance to cause covering of the head of the occupant by the harness means, motor means providing longitudinal axial shaft member, gearbox drive means connected to the motor means and on the axial shaft member, controller pulley means mounted on the axial shaft member of the motor means and engaged by and controlled by the gearbox means, tension belt means mounted on the pulley means and connected to the harness means, the tension belt means being controlled by the gearbox means through the pulley means to effect restraint deceleration control of the movements of the harness means holding the moving occupant during impact collision.

2. The improved car seat pressure deceleration controller apparatus of claim 1 wherein there is provided angle meter means connected to the tension belt means to sense angular movement of the tension belt means, and to generate output signals responsive to the angular movements of the tension belt means, and programmable logic computer and PC computer circuit means to receive the angular signals of the angle meter means.

3. The improved car seat pressure deceleration controller apparatus of claim 2 wherein there is provided electronic weight scale means connected to the tension belt means to sense force of movement of the harness means, and to generate output signals responsive to the force of the movements of the harness means, speedometer encoder means to sense speed of travel of the occupant upon and during collision impact, and to generate output signals responsive thereto, and the programmable logic computer and PC computer circuit means receives the output signals of the electronic weight scale means and the output signals of the speedometer encoder means, and utilizes the angle meter means signals, the electronic weight scale means signals and the speedometer encoder means signals to triangulate the position of the occupant on and during collision impact.

4. The improved car seat pressure deceleration controller apparatus of claim 1 wherein there is provided electronic weight scale means connected to the tension belt means to sense force of movement of the harness means, and to generate output signals responsive to the force of the movements of the harness means, and programmable logic computer and PC computer circuit means to receive the electronic weight scale signals.

5. The improved car seat pressure deceleration controller apparatus of claim 1 wherein the tension belt means are mounted on the pulley means and driven by the gearbox drive means.

6. The improved car seat pressure deceleration controller apparatus of claim 1 wherein there is provided speedometer encoder means to sense speed of travel of the occupant upon and during collision impact, and to generate output signals responsive thereto, and programmable logic computer and PC computer circuit means to receive the output signals of the speedometer encoder means.

7. The improved car seat pressure deceleration controller apparatus of claim 1 wherein there is provided a pair of tension belt means, a first tension belt means of the pair being mounted on a left side in the direction of travel, of the motor means and connected to a left side of the harness means, and a second tension belt means of the pair being mounted on a right side in the direction of travel, of the motor means and connected to a right side of the harness means.

8. The improved car seat pressure deceleration controller apparatus of claim 7 wherein there is provided a pair of angle meter means, and one of the pair thereof being connected to the first tension belt means, and the other of the pair thereof connected to the second tension belt means, each of the pair of angle meter means reading angular movements of the associated tension belt means, and each of the pair of angle meter means sending output signals responsive to the angular movements of the associated tension belt means, to the programmable logic computer and PC computer circuit means.

9. The improved car seat pressure deceleration controller apparatus of claim 1 wherein there is provided a pair of gearbox drive means connected to the motor means, one of the pair thereof being connected to a left side of the motor means, and the other of the pair thereof connected to a right side of the motor means, a pair of pulley means, one of the pair thereof being connected to a left side of the gearbox means, and the other of the pair thereof connected to a right side of the gearbox means, a pair of tension belt means, one of the pair thereof being connected to a left side pulley means and to the a side of the harness means, and the other of the pair thereof being connected to a right side pulley means and to a right side of the harness means, whereby each of the gearbox drive means in combination with the motor means drives the associated pulley means and the connected associated tension belt means to provide control of movement of the harness means.

10. The improved car seat pressure deceleration controller apparatus of claim 1 wherein the harness means in the non-activated position thereof presents a left side portion and a right side portion corresponding to the left side of the occupant and the right side of the occupant, respectively, and the improved car seat pressure deceleration controller apparatus further comprising two separate pairs of guidance controller pulley means, both pair thereof having a frontal positioned pulley means and an aligned rearwardly positioned pulley means extending from the plane in which the solenoid means is mounted, and one pair of the guidance controller pulley means is mounted in general alignment with a left side of the harness means, and the other pair of the guidance controller pulley means is mounted in general alignment with a right side of the harness means, and the cable means provides a pair of cables to extend over a left side pair of the separate pairs of guidance controller pulley means and a right side pair of the two separate pairs of guidance controller pulley means, respectively, to engage the left side of the harness means and the right side of the harness means, respectively, to move the left side of the harness means and the right side of the harness means simultaneously, with activation of the solenoid means.

11. An improved car seat pressure deceleration controller apparatus for use in passenger vehicles carrying seated occupant useful for safety of occupant upon collision impact there, comprising in combination, movable harness means having centrally disposed net, and being held in a non-activated position generally across the mid-section of the upright seated occupant thereof, pressure switch means activated by the seated occupant, electric solenoid means movable with detractive movement and activated by solenoid input signal upon collision impact, cable means connecting the solenoid means to the movable harness means effective upon detractive movement of the solenoid means, to pull the harness means upwardly by a predetermined distance to cause covering of the head of the occupant by the harness means, a motor means providing longitudinal axial shaft member, gearbox drive means connected to the motor means and on the axial shaft member, controller pulley means mounted on the axial shaft member of the motor means and engaged by and controlled by the gearbox means, tension belt means mounted on the pulley means and connected to the harness means, the tension belt means being controlled by the gearbox means through the pulley means to effect restraint deceleration control of the movements of the harness means holding the moving occupant during impact collision, angle meter means connected to the tension belt means to sense angular movement of the tension belt means, and to generate output signals responsive to the angular movements of the tension belt means, and programmable logic computer and PC computer circuit means to receive the angular signals of the angle meter means, wherein there is provided a pair of gearbox drive means connected to the motor means and the motor means and the gearbox drive means providing deceleration control movements thereof, a pair of pulley means, each one of the pair thereof being connected to an associated one of the pair of gearbox drive means and driven thereby, and a pair of tension belt means, each one of the pair thereof being connected to an associated one of the pulley means, and being driven by the gearbox drive means through connecting with the pulley means, each of the pair of tension belt means being connected to the harness means in spaced-apart connections thereto, and each of the pair of gearbox drive means in combination with the motor means drives the associated pair of pulley means and the connected associated pair of tension belt means to provide improved deceleration control of movements of the harness means.

12. An improved car seat pressure deceleration controller apparatus for use in passenger vehicles carrying seated occupant useful for safety of occupant upon collision impact thereof, comprising in combination, movable harness means having centrally disposed net, and being held in a non-activated position generally across the mid-section of the upright seated occupant thereof, pressure switch means activated by the seated occupant, electric solenoid means movable with detractive movement and activated by solenoid input signal upon collision impact, cable means connecting the solenoid means to the movable harness means effective upon detractive movement of the solenoid means, to pull the harness means upwardly by a predetermined distance to cause covering of the bead of the occupant by the harness means, a motor means providing longitudinal axial shaft member, gearbox drive means connected to the motor means and on the axial shaft member, controller pulley means mounted on the axial shaft member of the motor means and engaged by and controlled by the gearbox means, tension belt means mounted on the pulley means and connected to the harness means, the tension belt means being controlled by the gearbox means through the pulley means to effect restraint deceleration control of the movements of the harness means holding the moving occupant during impact collision, angle meter means connected to the tension belt means to sense angular movement of the tension belt means, and to generate output signals responsive to the angular movements of the tension belt means, and programmable logic computer and PC computer circuit means to receive the angular signals of the angle meter means, wherein there is provided electronic weight scale means connected to the tension belt means to sense force of movement of the harness means, and provide output signals responsive to the force of the movements of the harness means, speedometer encoder means to sense speed of travel of the occupant upon and during collision impact, and to provide output signals responsive thereto, and the programmable logic computer and PC computer circuit means receives the output signals of the electronic weight scale means and the output signals of the speedometer encoder means, and combines the output signals of the angle meter means, the electronic weight scale means and the speedometer encoder means to provide triangular positions of the harness means corresponding to positions of the occupant engaged by the harness means.

13. An improved car seat pressure deceleration controller apparatus for use in passenger vehicles carrying seated occupant useful for safety of occupant upon collision impact thereof, comprising in combination, movable harness means having centrally disposed net means, and being held in a non-activated position generally across the mid-section of the upright seated occupant thereof, and being moved to an elevated position to engage over the head of the occupant in an activated position, electric solenoid means movable upon activation thereof to move with predetermined detractive movement, cable means connecting between the solenoid means and the harness means to move the harness means responsive to the predetermined detractive movement of the solenoid means, whereby the harness means in the activated position thereof is elevated over the head of the occupant, activation means to sense the event of collision impact, to activate the solenoid means.

14. An improved car seat pressure deceleration controller apparatus as claimed in claim 13, wherein there is provided motor means providing longitudinal axial shaft member, gearbox drive means connected to the motor means and on the axial shaft member, controller pulley means mounted on the axial shaft member of the motor means and engaged by and controlled by the gearbox drive means, tension belt means mounted on the pulley means and connected to the harness means, the tension belt means being controlled by the gearbox drive means through the pulley means to effect restraint deceleration control of the movements of the harness means holding the moving occupant during impact collision.

* * * * *